(12) United States Patent
Segal et al.

(10) Patent No.: US 9,980,183 B1
(45) Date of Patent: May 22, 2018

(54) MEDIA AND COMMUNICATIONS IN A CONNECTED ENVIRONMENT

(71) Applicant: Essential Products, Inc., Palo Alto, CA (US)

(72) Inventors: Mara Clair Segal, San Francisco, CA (US); Manuel Roman, Sunnyvale, CA (US); Dwipal Desai, Palo Alto, CA (US); Andrew E. Rubin, Los Altos, CA (US)

(73) Assignee: ESSENTIAL PRODUCTS, INC., Palo Alto, CA (US)

( * ) Notice: Subject to any disclaimer, the term of this patent is extended or adjusted under 35 U.S.C. 154(b) by 0 days. days.

(21) Appl. No.: 15/599,413

(22) Filed: May 18, 2017

Related U.S. Application Data

(60) Provisional application No. 62/449,750, filed on Jan. 24, 2017, provisional application No. 62/486,380, filed on Apr. 17, 2017, provisional application No. 62/486,385, filed on Apr. 17, 2017.

(51) Int. Cl.
*H04L 12/28* (2006.01)
*H04W 36/00* (2009.01)
*H04W 36/14* (2009.01)
*H04W 36/18* (2009.01)
*H04W 36/32* (2009.01)
*H04N 7/14* (2006.01)
*H04N 9/87* (2006.01)
*H04J 1/16* (2006.01)

(52) U.S. Cl.
CPC ....... *H04W 36/005* (2013.01); *H04L 12/2816* (2013.01); *H04N 7/14* (2013.01); *H04N 9/87* (2013.01); *H04W 36/14* (2013.01); *H04W 36/18* (2013.01); *H04W 36/32* (2013.01); *H04L 2012/2841* (2013.01); *H04L 2012/2849* (2013.01)

(58) Field of Classification Search
USPC ................................. 370/252, 265, 386, 352
See application file for complete search history.

(56) References Cited

U.S. PATENT DOCUMENTS

| 7,003,463 | B1 * | 2/2006 | Maes ................ H04L 29/06027 704/231 |
| 9,729,821 | B1 | 8/2017 | Fineberg et al. |
| 2005/0289264 | A1 * | 12/2005 | Illowsky ............... G06F 1/3203 710/104 |
| 2006/0022802 | A1 | 2/2006 | Bridgelall et al. |

(Continued)

OTHER PUBLICATIONS

Non-Final Office Action dated Nov. 3, 2017 for U.S. Appl. No. 15/673,187 of Segal, M., et al., filed Aug. 9, 2017.

(Continued)

*Primary Examiner* — John Pezzlo
(74) *Attorney, Agent, or Firm* — Perkins Coie LLP

(57) ABSTRACT

Facilitating a conversation using resources of devices within an environment is described. A user within an environment can be determined to be engaged in a conversation with another person via a mobile device. Characteristics of the environment can be determined and devices that can provide playback of content of the conversation or receive content of the conversation can be identified based on the characteristics of the environment. Playback of content and receiving of content can then be provided using the resources of the devices.

24 Claims, 5 Drawing Sheets

(56) References Cited

U.S. PATENT DOCUMENTS

| | | |
|---|---|---|
| 2008/0220781 A1 | 9/2008 | Karia et al. |
| 2009/0213844 A1* | 8/2009 | Hughston ............ H04M 3/4872 |
| | | 370/352 |
| 2010/0141839 A1 | 6/2010 | Supran et al. |
| 2010/0279670 A1 | 11/2010 | Ghai et al. |
| 2012/0231773 A1 | 9/2012 | Lipovski et al. |
| 2014/0032758 A1* | 1/2014 | Barton .................... H04L 41/00 |
| | | 709/225 |
| 2014/0181886 A1 | 6/2014 | Goodman et al. |

OTHER PUBLICATIONS

Non-Final Office Action dated Oct. 5, 2017 for U.S. Appl. No. 15/599,409 of Segal, M., et al., filed May 18, 2017.
Szczys, Mike, "RFID Tracking System", Hackaday [Website], downloaded on Oct. 29, 2017 from «https://hackaday.com», Feb. 20, 2010, 1 page.
U.S. Appl. No. 15/673,187 of Segal, M.C et al., filed Aug. 9, 2017.
U.S. Appl. No. 15/673,217 of Segal, M.C et al., filed Aug. 9, 2017.
U.S. Appl. No. 15/599,409 of Segal, M. C. et al. filed May 18, 2017.
International Search Report and Written Opinion dated Feb. 6, 2018 for International Application No. PCT/US2018/13589 filed Jan. 12, 2018, 13 pages.
Szczys, Mike, "RFID Tracking System", Hackaday [Website], Retrieved on Oct. 29, 2017, from <https://hackaday.com/>, Feb. 20, 2010, 1 page.

\* cited by examiner

MEDIA AND COMMUNICATIONS IN A CONNECTED ENVIRONMENT

CLAIM FOR PRIORITY

This application claims priority to U.S. Provisional Patent Application No. 62/449,750, entitled "Boundless Media and Communications in a Connected Environment," by Segal et al., and filed on Jan. 24, 2017. This application also claims priority to U.S. Provisional Patent Application No. 62/486,380, entitled "Media and Communications in a Connected Environment," by Segal et al., and filed on Apr. 17, 2017. This application also claims priority to U.S. Provisional Patent Application No. 62/486,385, entitled "Media and Communications in a Connected Environment," by Segal et al., and filed on Apr. 17, 2017. The content of the above-identified applications are incorporated herein by reference in their entirety.

TECHNICAL FIELD

This disclosure relates to media and communications, and in particular media and communications in a connected environment such as a home.

BACKGROUND

The Internet of Things (IoT) allows for the internetworking of devices to exchange data among themselves to enable sophisticated functionality. For example, devices configured for home automation can exchange data to allow for the control and automation of lighting, air conditioning systems, security, etc. In the smart home environment, this can also include home assistant devices providing an intelligent personal assistant to respond to speech. However, seamlessly providing services across all of the devices in the home can be difficult.

SUMMARY

Some of the subject matter disclosed herein includes a home assistant device, including: a camera configured to generate an image frame representing an environment of the home assistant device; a microphone configured to receive speech of a user engaged in a conversation using a mobile phone and spoken within the environment of the home assistant device; a memory configured to store device information representing devices within the environment, each of the devices having one or more of a display screen, a microphone, a speaker, or a camera; and a processor configured to determine characteristics of the environment, characteristics of the conversation between the user and a participant different than the user that is also engaged in the conversation, and characteristics of the user providing the speech based on the image frames representing the environment and the speech spoken within the environment, and the processor configured to transfer audio content corresponding to the participant of the conversation from being played back by the mobile phone to speakers of the devices within the environment, provide video content corresponding to the participant of the conversation using display screens of the devices within the environment, provide audio content corresponding to the user for the conversation using the microphones of the devices within the environment, and provide video content corresponding to the user for the conversation using the cameras of the devices within the environment.

Some of the subject matter described herein also includes a method including: determining that a user within an environment is engaged in a conversation with another participant outside of the environment using a mobile device; determining, by a processor, characteristics of the environment; determining devices within the environment that can provide playback of content of the conversation corresponding to the participant or can receive content of the conversation corresponding to the user based on the characteristics of the environment; providing playback of the content of the conversation corresponding to the participant using a first set of resources of the devices; and receiving content of the conversation corresponding to the user using a second set of resources of the devices to provide to the participant, the first set of resources and the second set of resources being different.

In some implementations, the first set of resources includes one or more of display screens or speakers of the devices within the environment, and the second set of resources includes one or more of cameras or microphones of the devices within the environment.

In some implementations, the conversation using the mobile device includes audio content, and the playback of the content of the conversation includes audio content and video content.

In some implementations, determining characteristics of the environment includes determining a location of the user within the environment, and wherein the second set of resources are selected based on the location of the user within the environment.

In some implementations, determining characteristics of the environment includes identifying other people not engaged in the conversation within the environment, and wherein the first set resources and the second set of resources are selected based on the identification of other people in the environment.

In some implementations, determining characteristics of the conversation between the user and the participant, and wherein the first set of resources and the second set of resources of the devices are selected based on the characteristics of the conversation.

In some implementations, the characteristics of the conversation include content of the conversation.

In some implementations, the characteristics of the conversation include how the user is engaged within the conversation with the other participant.

Some of the subject matter described herein also includes a computer program product, comprising one or more non-transitory computer-readable media having computer program instructions stored therein, the computer program instructions being configured such that, when executed by one or more computing devices, the computer program instructions cause the one or more computing devices to: determine that a user within an environment is engaged in a conversation with another participant outside of the environment using a mobile device; determine characteristics of the environment; determine devices within the environment that can provide playback of content of the conversation corresponding to the participant or can receive content of the conversation corresponding to the user based on the characteristics of the environment; provide playback of the content of the conversation corresponding to the participant using a first set of resources of the devices; and receive content of the conversation corresponding to the user using a second set of resources of the devices to provide to the participant, the first set of resources and the second set of resources being different.

In some implementations, the first set of resources includes one or more of display screens or speakers of the devices within the environment, and the second set of resources includes one or more of cameras or microphones of the devices within the environment.

In some implementations, the conversation using the mobile device includes audio content, and the playback of the content of the conversation includes audio content and video content.

In some implementations, determining characteristics of the environment includes determining a location of the user within the environment, and wherein the second set of resources are selected based on the location of the user within the environment.

In some implementations, determining characteristics of the environment includes identifying other people not engaged in the conversation within the environment, and wherein the first set resources and the second set of resources are selected based on the identification of other people in the environment.

In some implementations, the computer program instructions cause the one or more computing devices to: determine characteristics of the conversation between the user and the participant, and wherein the first set of resources and the second set of resources of the devices are selected based on the characteristics of the conversation.

In some implementations, the characteristics of the conversation include content of the conversation.

In some implementations, the characteristics of the conversation include how the user is engaged within the conversation with the other participant.

Some of the subject matter described herein also includes an electronic device, including: a memory configured to store device information representing devices within an environment; and a processor configured to determine that a user within the environment is engaged in a conversation with another participant outside of the environment, the processor configured to determine characteristics of the environment, and the processor configured to select a first set of devices to provide playback of content of the conversation corresponding to the other participant for the user and a second set of devices having resources to provide content corresponding to the user for the other participant in the conversation outside of the environment, the first set of devices and the second set of devices selected based on the characteristics of the environment.

In some implementations, the first set of devices and the second set of devices are different, the first set of devices including one or more of display screens or speakers, the second set of devices including one or more of cameras or microphones.

In some implementations, the electronic device includes: a microphone configured to receive speech corresponding to the user engaged in the conversation; and a camera configured to generate an image frame representing the environment, wherein the characteristics of the environment are determined based on the speech received via the microphone and the image frame representing the environment generated by the camera.

In some implementations, the characteristics of the environment includes determining a location of the user within the environment, and wherein the first set of the devices and the second set of the devices are selected based on the location of the user within the environment.

In some implementations, determining characteristics of the environment includes identifying other people not engaged in the conversation within the environment, and wherein the first set of the devices and the second set of the devices are selected based on the identification of other people in the environment.

In some implementations, the processor is further configured to determine characteristics of the conversation between the user and the participant, and wherein the first set of the devices and the second set of the devices are selected based on the characteristics of the conversation.

In some implementations, the characteristics of the conversation include content of the conversation.

In some implementations, the characteristics of the conversation include how the user is engaged within the conversation with the other participant.

DETAILED DESCRIPTION

This disclosure describes devices and techniques for managing services in an environment with connected devices. In one example, a user can use a mobile phone to have a conversation with others by communicating over a communication link established with a cellular network outside of a home. The communication link can include audio content (e.g., speech of the conversation) transmitted and received by the mobile phone. Eventually, the user can return to the home while still engaged in the conversation on the mobile phone. An assistant device in the home can determine that the user is having a conversation on the mobile phone and then establish another communication link for the conversation using the devices within a wireless network of the home. For example, the conversation can be shifted to using a communication link using a local wireless network established within the physical space of the home rather than the cellular network. Additionally, the new communication link can provide video as well as the audio by using camera devices within the home. Thus, the devices within the home such as televisions, speakers, etc. can be used to facilitate the conversation by providing resources such as display screens, speakers, microphones, etc. that can be coordinated with or by the assistant device. As a result, communications can be seamlessly shifted to take advantage of the connected environment.

In a second example, a user can subscribe to several services (e.g., music services providing playback of music, video services providing playback of video content, etc.). The home's connected environment can include several devices (e.g., speakers, televisions, etc.) that can play back the music and video content. An assistant device can manage the playback of the content from the different services on the devices in the connected environment.

Figure 1:
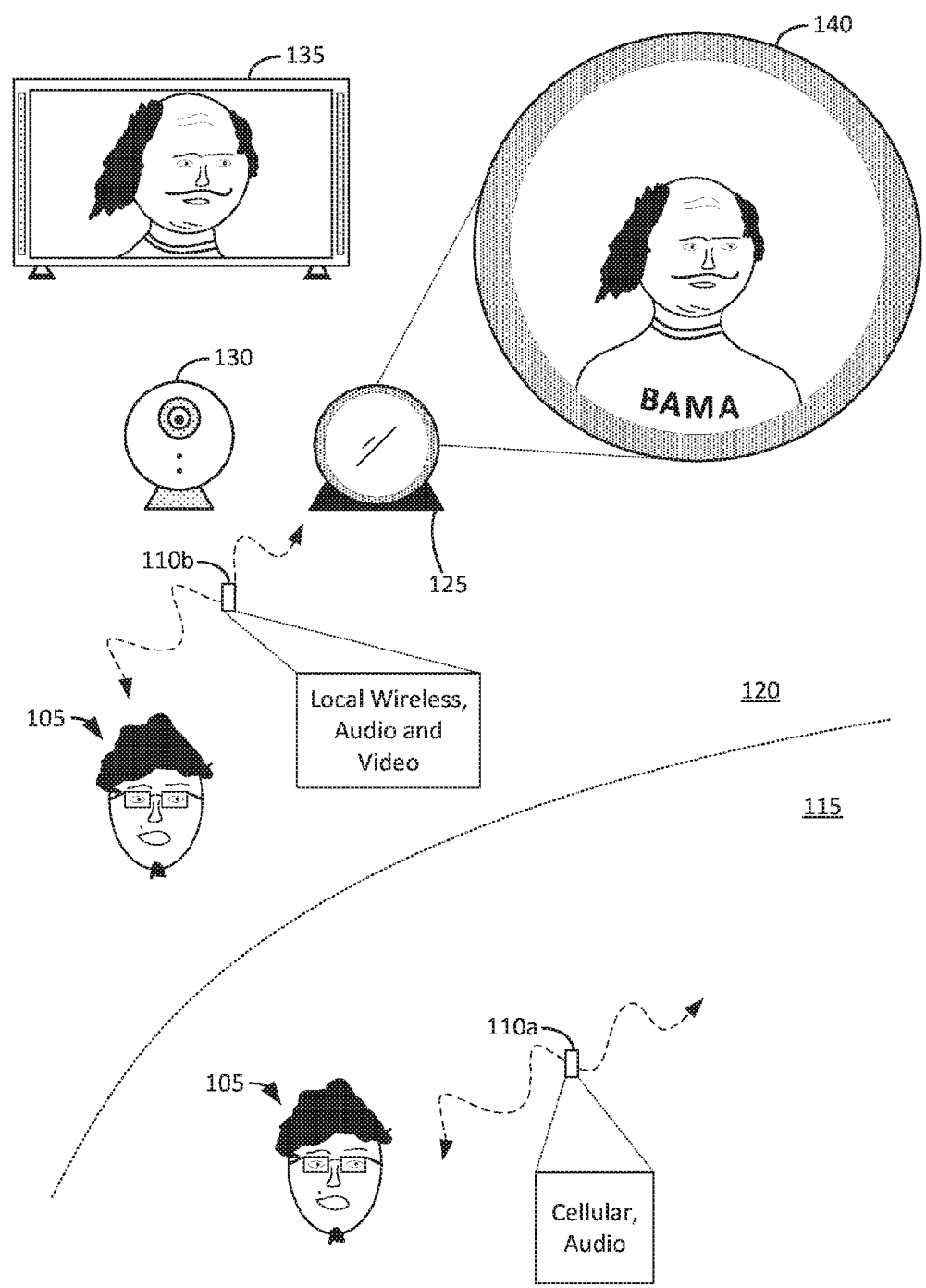
FIG. 1 illustrates an example of an assistant device transferring communications among devices.

In more detail, FIG. 1 illustrates an example of an assistant device transferring communications among devices. In FIG. 1, user 105 can be outside 115 of a home connected environment 120 (i.e., outside of the range of the home's wireless network, such as a wireless local area network (WLAN) implementing one of the IEEE 802.11 standards as provided by a router within the home, a personal area network (PAN) implemented with Bluetooth®, etc.). User 105 can use a mobile phone to make a phone call to have a conversation with someone else. Therefore, the mobile phone can establish communication 110a, which can include a communication link established over a cellular network (e.g., GSM, LTE, etc.). Due to the bandwidth limitations of the cellular network, communication 110a can be limited to audio content (e.g., speech of the participants of the conversation).

Eventually, user 105 can return to his home while still having the conversation on his mobile phone over communication 110a (i.e., the cellular communication link providing audio content). In home connected environment 120, assistant device 125 can determine that user 105 is having a conversation with his mobile phone, and transfer the conversation to be over communication 110b, which can be a communication link using the wireless network (e.g., WLAN) of home connected environment 120 and include audio as well as video content. That is, assistant device 125 can seamlessly transfer the conversation from the mobile phone using communication 110a of a cellular network to communication 110b of a WLAN so that user 105 can continue the conversation using the additional devices within home connected environment 125. For example, assistant device 125 can use the WLAN to establish the conversation using the Internet and direct content of the conversation using the WLAN to other devices within home connected environment 120, such as televisions, speakers, etc. These other devices can have resources such as display screens, microphones, speakers, cameras, etc. that can be used for the playback of content of the conversation (e.g., speech of another participant) or provide content for the conversation (e.g., the speech of user 105). This can occur because the mobile phone and assistant device 125 might have several radios for wireless communications that are configured to operate within different frequency ranges of the electromagnetic spectrum. One radio of the mobile phone might operate at the frequency range for communication 110a (e.g., 824-849 Megahertz (MHz), 869-894 MHz, etc. as used for some cellular communications) and another radio (or radios) of assistant device 125 and other devices within the environment might operate at the frequency range for communication 110b (e.g., 2.4-2.5 Gigahertz (GHz), 4.915-5.825, etc. as used for some IEEE 802.11 communications). Thus, the conversation can be switched from being transmitted and received via communication 110a using one radio to communication 110b using a second radio that operates in a different frequency range.

Additionally, the content of the conversation can be expanded to include video content because of the availability of video recording devices in home connected environment 120 and the increased bandwidth of communication 110b. For example, the local wireless network usually has higher bandwidth (e.g., can upload or download more data) than a cellular network. This can allow for the former audio-only conversation to turn into a video chat conversation including both video and audio content.

Assistant device 125 can include an intelligent home assistant responding (e.g., providing content, interacting with other devices, etc.) to voice input of user 105 as well as recognizing situations arising without the direct input of user 105. For example, as user 105 enters home connected environment 125, assistant device 125 can determine that user 105 has returned home and is having a conversation using communication 110a that can be switched to communication 110b. In some implementations, assistant device 125 can determine that user 105 is having the conversation using communication 110a because it can communicate with user 105's mobile phone and receive data indicating that the conversation is ongoing over the cellular network. In another implementation, assistant device 125 can include a microphone (or microphone array) to detect that user 105 is having a conversation on a mobile phone, for example, using voice recognition. In another implementation, assistant device 125 can use the local resources within home connected environment 120 to determine that the conversation is ongoing. For example, camera 130 can be connected (e.g., communicatively coupled) with the WLAN and assistant device 125 can receive video data from camera 130 (e.g., camera 130 can generate image frames of the environment including image content portraying user 105 speaking on the mobile phone) and determine that user 105 is having the conversation based on the video data and/or audio data using image and voice recognition, respectively. In some implementations, assistant device 125 can include an integrated camera.

Once assistant device 125 has determined that user 105 is having a conversation on a mobile phone using communication 110a, the local resources of home connected environment 120 can be utilized. For example, assistant device 125 can have a record (or determine) the available local resources and use the capabilities of those local resources to provide content related to the conversation. In one example, as devices including display screens, speakers, microphones, or other functionality that can be used to facilitate conversations connect with the home's wireless network, assistant device 125 itself can be connected to the same wireless network and determine that a new device has connected, and determine the capabilities of that new device (e.g., the device includes a display screen and speakers so that video and audio data can be played back with it). In some implementations, user 105 can indicate (e.g., by selecting preferences to be associated with a user profile that can be looked up by assistant device 125 upon recognizing user 105 is engaged in a conversation) which devices (i.e., which local resources) of home connected environment should be used in the techniques disclosed herein.

In FIG. 1, assistant device 125 can provide video content representing the other participant in the conversation on television 135 or on display screen 140 of assistant device 125. For example, if the other participant has a video camera available, then that video camera can provide video content. Additionally, video data of user 105 can be provided to the other participant in the conversation using camera 130. As such, the local resources available within the home's connected environment can be used to continue the conversation.

In some implementations, as user 105 walks throughout the rooms of the home, his location can be detected in that room by assistant device 125 using cameras, sound recognition, etc. Assistant device 125 can determine the local resources within that room (e.g., checking which devices are activated or turned on, accessing memory storing data indicating the devices in that room, etc.) and provide the video and audio data to the appropriate devices in that room upon determining that the user is there. If user 105 walks into another room, the local resources within that other room can be provided the video and audio data. The video and audio data can no longer be provided to the devices in the first room to reduce the bandwidth usage of the WLAN of home connected environment 140 so that the conversation can continue seamlessly.

In some implementations, user 105 can still hold the conversation on the mobile phone even as the conversation switches to communication 110*b*. If user 105 puts down the mobile phone (e.g., as detected using camera 130), then the conversation can cease to be provided by it, but the other devices in the home connected environment 120 can maintain the conversation.

In some implementations, the context (or characteristics) of the connected environment, characteristics of the conversation or other participants of the conversation, or characteristics of users can be determined and those context and/or characteristics can be used to determine whether to transfer the conversation, which devices should be used to provide content for the transferred conversation, or what type of content to include in the transferred conversation.

For example, assistant device 125 can identify whether other people are within the connected environment using camera 130 (for visual identification) or its microphone (for audio identification). Some examples of visual recognition algorithms include classification algorithms, clustering algorithms, ensemble learning algorithms, Bayesian networks, Markov random fields, Multilinear subspace learning algorithms, real-valued sequence labeling algorithms, and/or regression algorithm. If so, user 105 might not want the conversation to switch from communication 110*a* to communication 110*b* to maintain some privacy. As a result, assistant device 125 can let the conversation remain with communication 110*a*. If user 105 is alone within the home, then the conversation can switch to communication 110*b*. Thus, the presence of others in the environment can be identified and used to determine whether to switch the conversation from communication 110*a* to communication 110*b*.

In some implementations, the person that user 105 is having the conversation with can be identified and based on that person's identity, it can be determined whether to transfer the conversation to use the local resources of the connected environment or the type of content for the transferred conversation. For example, family and friends can be identified as the type of people that user 105 might want to have a video conference with. By contrast, strangers or co-workers might be identified as the type of people that user 105 might want to keep to audio conversations rather than video chats. As a result, when the conversation is switched to communication 110*b*, and the other participants of the conversation include family or friends, then the conversation can be a video chat by having communication 110*b* provide both audio and video content. By contrast, if the other participants include strangers or co-workers, then the conversation switched to communication 110*b* can only include audio content.

The other participants of the conversation with user 105 can be determined by assistant device 125 obtaining such information from the mobile phone, audio recognition, etc. For example, the mobile phone can indicate to assistant device 125 who the conversation is with by providing a name, the phone number of the other participant in the conversation, etc. If provided the phone number or name, then assistant device 125 can access other resources, such as a social media account, cloud-based contact books or address books, or even its own resources storing contact information of people to determine the type of relationship that user 105 has with the other participant of the conversation (i.e., the type of participant, such as co-worker, family, friend, stranger, etc.). Thus, in an example, if a co-worker is identified as someone in the conversation, then the conversation can be maintained with communication 110*a* rather than switching to communication 110*b*. In another example, if a co-worker is identified as someone in the conversation, then the conversation can be switched to communication 110*b*, but video content can be excluded (i.e., the conversation is kept to audio).

The time of the conversation can be used to determine whether to establish communication 110*b*. For example, if user 105 is arriving at home in the evening, then the conversation can be maintained on communication 110*a* (e.g., cellular) rather than switching to communication 110*b* (e.g., using the WLAN). By contrast, if user 105 arrives in the daytime, then the conversation can be switched from communication 110*a* to communication 110*b*. In some implementations, the conversation can be switched from communication 110*a* to communication 110*b*, but the type of content to include in communication 110*b* can be based on the time of the conversation. For example, in the evening, communication 110*b* might only include audio content. However, in the daytime, communication 110*b* might include both audio and video content of the conversation.

Different users can be identified and those different users might have assistant device 125 set up differently to manage the switch from communication 110*a* to communication 110*b*. For example, users can establish a profile indicating the situations in which a conversation should be switched to communication 110*b*. In some implementations, assistant device 125 can use a variety of machine learning algorithms to determine over time how the users would want to switch conversations.

How the user is engaged or acting within the conversation can be determined and used to determine whether to switch the conversation to communication 110*b*, or the types of content (e.g., audio, video) that should be established for the conversation. For example, the volume of the speech of user 105 engaged in the conversation or the speech of the other participants in the conversation can be determined using the microphone of assistant device 125 or data regarding the volume can be obtained by assistant device 125 from the mobile phone. If that volume is above a threshold volume level or within a high volume range (e.g., at a high volume), then this can indicate that the conversation might not include sensitive or private information being discussed and, therefore, the conversation can be switched to communication 110*b* and also include video content as well as audio content. However, if that volume is below the threshold volume level or within a low volume range (e.g., at a low volume), then this might indicate that the conversation is relatively sensitive or includes private information being discussed. User 105 might not want the conversation to be switched to communication 110*b*. Thus, assistant device 125 can refrain from doing so.

The physical movements of user 105 can also be determined and used in similar ways. For example, if user 105 is determined to be moving relatively fast (e.g., at a speed within a speed range corresponding to a high speed as detected by an analysis of several image frames generated by camera 130), then user 105 might not want to be disturbed with having to switch attention from his mobile phone to the other resources when the conversation is switched to communication 110*b*, or might want the conversation to be switched to communication 110*b* but only include audio content so that the user does not have to look at a display screen. Thus, the conversation can be switched accordingly (e.g., switch to communication 110*b* but not include video content based on the user's physical movements). In another example, user 105 might be engaged in some activities (e.g., eating) and if detected to be engaged in that activity (e.g., using camera 130 and image recognition techniques), then the conversation can be maintained using communication 110*a*, or switched to communication 110*b* but without video content so that the other participants in the conversation cannot see that user 105 is engaged in that activity.

The physical appearance of user 105 or other participants within the conversation can also be determined and used in a similar manner. For example, if user 105 recently woke up from sleep, returns from a long night out, etc. then he might not want the conversation to switch to communication 110*b* and include video content because he might have unkempt hair, be clothed in pajamas, etc. Thus, the physical characteristics of user 105 can be determined and the conversation can be maintained on communication 110*a*, or switched to communication 110*b* but only include audio content (i.e., no video content) based on the characteristics such as physical appearance of user 105.

Similarities between user 105 and other participants within the conversation can be determined. For example, in FIG. 1, within home connected environment 120, the conversation can be switched to communication 110*b* and be expanded to include video content, as previously discussed. This can occur if one or both user 105 and the other participant have access to cameras such as camera 130. In some implementations, image frames of both users can be generated using the cameras and analyzed and if there are similarities between the users, then the conversation can be switched to communication 110*b*, or be switched to communication 110*b* and include video content. For example, if both user 105 and the other participant are wearing sweatshirts with text written upon them (e.g., a university name, company name, etc.), then the textual content can be recognized as existing within the image frames, extracted, and analyzed. If there are similarities between the text in the different image frames corresponding to user 105 and the other participant, such as both having sweatshirts with the same university name, then communication 110*b* can include video content. This might be done because user 105 and the other participant are likely to know each other due to wearing the same sweatshirt. Other textual content, such as text on diplomas on walls, text on identification badges worn on users, etc. can also be used. Lack of similarity can result in no video content being provided. In some implementations, similar visual content other than textual content can also be used. For example, if both users both have the same sculpture (or same assistant device, same mug, etc.) on both of their desks and the sculpture is visible by cameras, then this can be used in a similar manner as similar textual content. Thus, an object can be recognized within the image frames portraying user 105 and the other participant and the recognition of the presence of that object can result in increased functionality for the conversation (e.g., provide video content).

The similarities between user 105 and other participants can also include similarities between their physical characteristics. For example, various measurements of facial characteristics (e.g., space between eyes, size of nose, shapes of facial features, etc.) can be measured and a score can be generated indicative of the similarities between user 105 and the participants within the conversation. Relatives might have a higher score than strangers. Thus, if the other participant in the conversation has a score representative of a relative, then communication 110*b* can include video content, or the conversation can be switched from communication 110*a* to communication 110*b*.

Sometimes, user 105 might wander around his home. For example, user 105 might enter his residence through the front door and into the living room. The conversation can be switched from communication 110*a* to communication 110*b*. Because the living room has television 135 and camera 130, the conversation can be expanded to include visual content. However, eventually user 105 might enter his bedroom and that bedroom might have another camera (e.g., a web camera for his computer). However, user 105 might consider his bedroom to be a more private or sensitive place than the living room. Thus, assistant device 125 can determine that user 105 has left the living room and entered a more private or sensitive room (i.e., the bedroom), and may then alter the conversation using communication 110*b* such that it no longer provides video content. The other participants of the conversation can then still be able to communicate with user 105, but only through audio rather than both audio and video. When user 105 returns to the living room, the video content can be restored. As a result, the location of user 105 within home connected environment 120 can be determined and that location can be used to determine what type of content to allow for the conversation.

In some implementations, the determination of whether certain locations are more private or sensitive can be determined by learning user behaviors, or identifying objects or devices within those locations. For example, user 105 can be heard to be snoring in a location, and this can be correlated with being from a bedroom. Thus, the recognition of certain sounds might be determined to be from a location such as a bedroom, which can be classified as a private or sensitive location. These determinations can also be made with visual determinations (e.g., recognizing night stands, alarm clocks, etc. that typically go in a bedroom) and the privacy or sensitivity determinations can be stored in a table of a database and accessed by assistant deice 125.

The content of the conversation between user 105 and the other participants can also be determined. For example, the topics being discussed, sounds in the background, etc. can be determined. If there is a lot of background noise including other speech (e.g., in a restaurant), then this can indicate that the other participant might be difficult to hear and, therefore, the conversation can be switched from communication 110*a* to communication 110*b* so that the conversation can be played back using the speakers of other local resources that might be louder and easier to understand than the speaker of the mobile device. The topics being discussed can also be determined, for example, if sensitive or private information are being discussed then communication 110*a* can be maintained (i.e., the conversation is not switched to communication 110*b*). In some implementations, assistant device 125 can store a dictionary of key words representative of sensitive or private topics. Assistant device 125 can recognize whether user 105 says one of those words, or if a participant in the conversation says one of those words, and then maintain communication 110*a*, switch the conversation to only include audio content or only video content, etc.

In some implementations, user 105 can maintain a calendar of his schedule. For example, user 105 can maintain a calendar on his mobile phone, on a computer, on a cloud service, etc. Assistant device 125 can access the user's calendar and obtain records of the meetings that user 105 has recorded. If the conversation is determined to be occurring at the time of one of those recorded meetings, then this can mean that this is an expected call and, therefore, the conversation can be switched to communication 110*b* and use both audio and visual content.

In some implementations, the conversation can remain with communication 110*a* even when user 105 enters home connected environment 120. However, upon the battery level (representative the current charge available of the battery) of the mobile device transitioning below a certain threshold (e.g., in a range corresponding to a low battery level such as 30% battery charge remaining), then the conversation can be switched to communication 110*b*. Thus, the local resources can be used when the battery of the mobile phone might be reaching a state when it can no longer provide communications. This can provide continuity to the conversation such that user 105 does not have to redial the other participant.

In some implementations, the signal strength for communication 110*a* can be determined and if it is beneath a threshold signal strength (e.g., in a range corresponding to a low signal strength) then the conversation can be established using communication 110*b*, as discussed herein.

In some implementations, user 105 can provide physical movements representing a gesture as an indication that the conversation should be switched to communication 110*b*. For example, the user can wave his hand at or point to assistant device 125. This can be recognized using camera 130, and then communication 110*b* can be established for the conversation.

In some implementations, user 105 might call a customer support line via communication 110*a*. User 105 might be "on hold" waiting for a live human customer support representative to assist with a problem, or might be navigating through an automated or interactive voice response system. When user 105 enters home connected environment 120, he might not want to dedicate many of his local resources to the conversation. Thus, assistant device 125 can determine that the call did not begin with a live, human participant (e.g., this can be recorded by the mobile phone and then obtained by assistant device 125) and, therefore, maintain communication 110*a* for the conversation, or switch the conversation to communication 110*b* but not include video content or only use some (i.e., not all) of the available devices within the connected environment of the home.

In some implementations, how long (e.g., duration in time) user 105 has been engaged within the conversation can also be determined and used in similar ways. If user 105 has been having the conversation for a threshold time period, then the conversation can be switched to communication 110*b*. For example, if user 105 has been having the conversation for an hour, then the conversation can switch to communication 110*b* from communication 110*a*. This can be helpful because it can be tiring to hold the mobile phone for a long period of time. By seamlessly switching from communication 110*a* to communication 110*b*, user 105 can maintain a longer conversation before getting too tired. In some implementations, the time period before switching can be set by the user, for example, indicated in preferences and stored with a profile for user 105. In some implementations, the time period can be variable based on any of the characteristics discussed herein. For example, the time period can be made longer or shorter in time duration if other people are detected within home connected environment 120.

In some implementations, how much of the conversation is the speech of user 105 can be determined and used to switch the conversation from communication 110*a* to communication 110*b*, or to determine whether to include video content with communication 110*b*. For example, assistant device 125 can listen to user 105 and if he has spoken for 20% of the conversation and the other participant has provided 80% of the speech spoken of the conversation (or speaking for 80% of the time of the conversation) then this might not be a conversation in which user 105 is as engaged in and, therefore, communication 110*b* might be limited to audio content. In another implementations, this might result in maintaining the conversation with communication 110*a* so that user 105 can use his local resources without having them used to provide audio or video content for the conversation.

Figure 2:
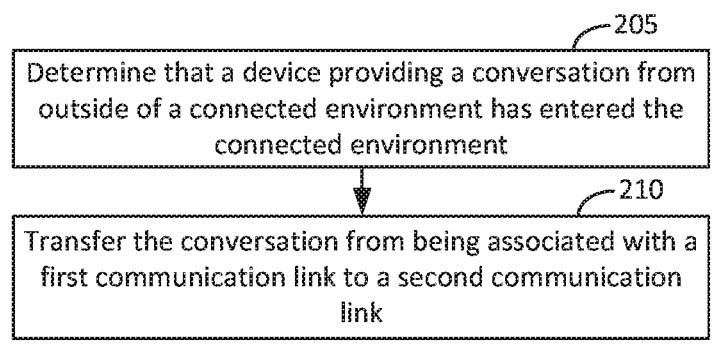
FIG. 2 illustrates an example of a block diagram for transferring communications among devices.

FIG. 2 illustrates an example of a block diagram for transferring a communications service among devices. In FIG. 2, at block 205 an assistant device can determine that a device providing a conversation from outside of a connected environment has entered the connected environment. For example, in FIG. 1, the mobile device of user 105 can be detected as entering the range of the WLAN, or wireless network, of home connected environment 120 (e.g., as provided by a router and/or access point to allow access to the Internet) and within the home. The mobile device can currently be using communication 110*a* for a conversation.

At block 210, the conversation can be transferred from a first communication link to a second communication link. For example, in FIG. 1, the conversation can be transferred from communication 110*a* using a cellular network to have an audio conversation to communication 110*b* using the wireless network of home connected environment 120 to have the conversation including both audio and video.

Figure 3:
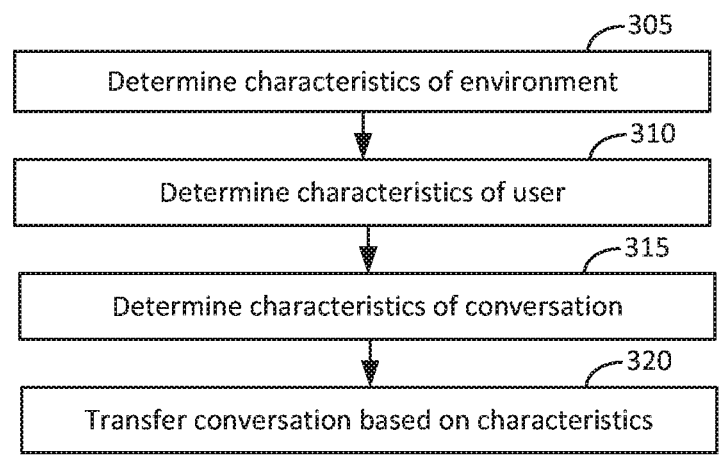
FIG. 3 illustrates an example of a block diagram for transferring communications based on characteristics of the environment, conversation, or user.

FIG. 3 illustrates an example of a block diagram for transferring communications based on characteristics of the environment, conversation, or user. As previously discussed, the context (or characteristics) of the connected environment, characteristics of the conversation or other participants of the conversation, or characteristics of users can be determined and those context and/or characteristics can be used to determine whether to transfer the conversation, which devices should be used to provide content for the transferred conversation, or what type of content to include in the transferred conversation. In FIG. 3, at block 305, characteristics of the environment can be determined. For example, the time, the people other than the user engaged in the conversation within the environment, etc. as discussed above can be determined. At block 310, characteristics of the user can be identified. For example, the user's physical movements, physical appearance, and location within the environment, etc. as discussed above can be determined. At block 315, characteristics of the conversation can be determined. For example, the other participants in the conversation, the type of relationship of the user with the other participants, the volume of speech, content of speech, etc. as discussed above can be determined. At block 320, the conversation can be transferred based on the characteristics. For example, the conversation can be transferred from using communication 110*a* to communication 110*b* in FIG. 1.

Figure 4:
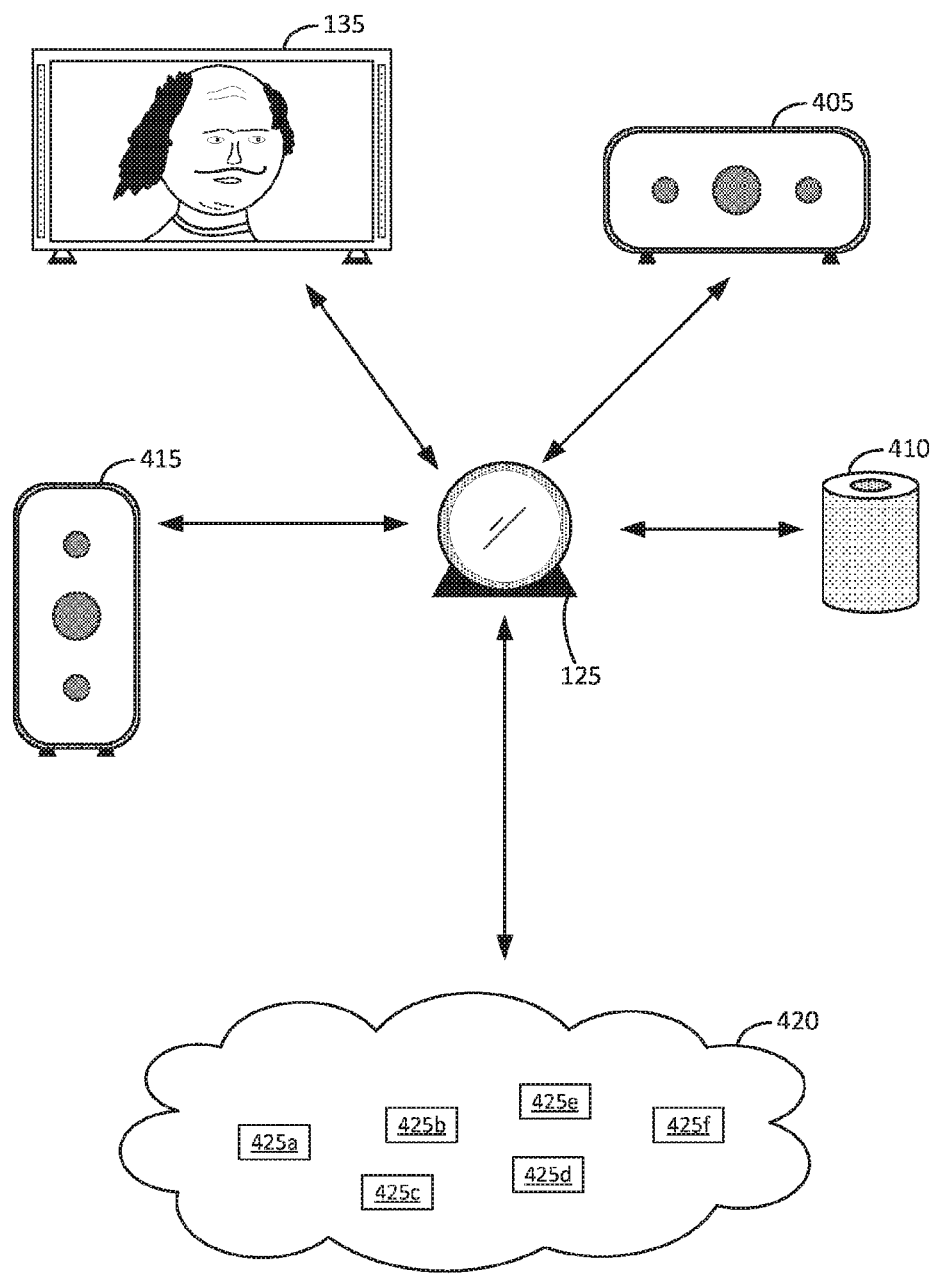
FIG. 4 illustrates an example of an assistant device managing playback of services among devices.

Assistant device 125 can also manage playback of other types of content other than conversations. FIG. 4 illustrates an example of an assistant device managing playback of services among devices. In FIG. 4, assistant device can access services 425*a-f* (e.g., accessed via Internet 420) and provide content from those services onto television 135, speaker 405, subwoofer 405, and speaker 415.

For example, in FIG. 4, services 425*a-c* can be Internet-based streaming music services. Services 425*e* and 425*d* can be streaming video services. Service 425*f* can be a cloud-based image or photo repository. Assistant device 125 can include details and functionality regarding how to access services 425a-f (e.g., usernames, passwords, software, etc.) and receive content data from services 425a-f to provide to one or more of television 135, speaker 405, subwoofer 410, or speaker 415 for playback.

For example, assistant device 125 can select service 425a to stream music in the connected environment. This can include assistant device 125 determining which devices to provide the music from service 425a. For example, assistant device 125 can store data representing how user 105 might want to play back content from services 425a-f and the devices that content should be played back on. Content from different services 425a-f can be played back on different devices. For example, the music from service 425a can be played back on speaker 405 and subwoofer 410. If service 425b is selected, then the music from that service can be played back on speaker 405, subwoofer 410, and speaker 415. That is, the content from different services can be played back on different devices even if the type of content is the same (e.g., music).

Different users can have different preferences. Assistant device 125 can store these preferences and then determine which devices in the connected environment should be provided the content data for playback. For example, one group of users might want to play back music on speaker 405 and subwoofer 410. However, another group of users might want to play back music on speaker, 405, speaker 415, and subwoofer 410. As a result, assistant device 125 can play back music from services 425a-c on different devices based on the users requesting the playback. In some implementations, if assistant device 125 detects users from different groups within the connected environment (e.g., one user from the first group wanting playback of music on speaker 405 and subwoofer 410, and a second user from the latter group wanting playback of music on speaker 405, speaker 415, and subwoofer 410), then assistant device can prioritize one group of the other and play back the music using that prioritized group's preferences. In some implementations, the playback can be performed on devices that were determined by assistant device 125 to be common to the groups. In some implementations, assistant device 125 might play back the music on an intermediate number of devices in between the number of devices specified by the different groups. For example, if one group of users wants to play back music on three devices, but another group of users wants to play back music of five devices, then four devices can be selected for playback. In some implementations, the playback preferences of the group with the highest number of users detected can be selected by assistant device 125.

As another example, if video from services 425e and 425d are to be played back within the connected environment, then the video and audio content of both can be played back on television 135. However, assistant device 125 might also play back the audio on subwoofer 410 when streaming video from service 425e. When streaming service 425d, subwoofer 410 might not be used.

In some implementations, assistant device 125 can analyze the content being provided by services 425a-f and then select the devices to be used to play back the content from the service. For example, assistant device can determine that an action movie with loud explosions is streaming from service 425d for play back on television 135. The playback experience can be improved by also providing audio data to subwoofer 410 so that the loud explosions have a more immersive experience. By contrast, if a drama movie is streaming for playback on television 135, then speakers 405 and 415 can be provided audio data, but subwoofer 410 can be left out of the playback experience.

In some implementations, assistant device 125 can determine the context of the environment of the home's connected environment and select devices for playback of content based on the determined context. For example, if assistant device 125 detects that a number of people in a room are above a threshold number, then more devices can be provided audio data. This can be done because many people in a room talking at once might result in the playback of audio (e.g., music) needing to be louder and from more devices. In some implementations, the volume (e.g., how loud) of the people in a room or other noises in the room can also be determined and used to adjust which devices are provided playback, the number of devices are provided playback, the volume of the devices playing back content, etc.

Figure 5:
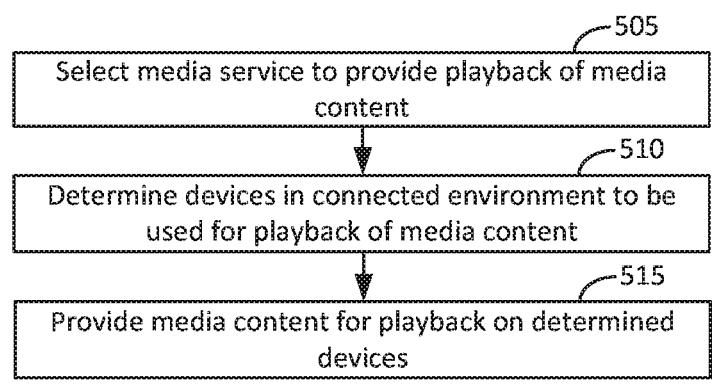
FIG. 5 illustrates an example of an assistant device managing playback of services among devices.

FIG. 5 illustrates an example of an assistant device managing playback of services among devices. In FIG. 5, at block 505, a media service can be selected to provide playback of content. For example, in FIG. 4, assistant device 125 can select one of services 425a-f to receive media content such as music, video, photos, etc. for playback. At block 510, the devices in a connected environment to be provided the media content for playback can be determined. For example, assistant device 125 in FIG. 1 can select one or more of television 135, speaker 405, speaker 415, and subwoofer 410 for playback of the media content. At block 515, the media content can be provided to the determined devices for playback. For example, in FIG. 4, assistant device 125 can provide music data to speaker 405 and subwoofer 410 for playback of the music from service 425a.

Many of the aforementioned examples discuss a home environment. In other examples, the devices and techniques discussed herein can also be set up in an office, public facility, etc.

Figure 6:
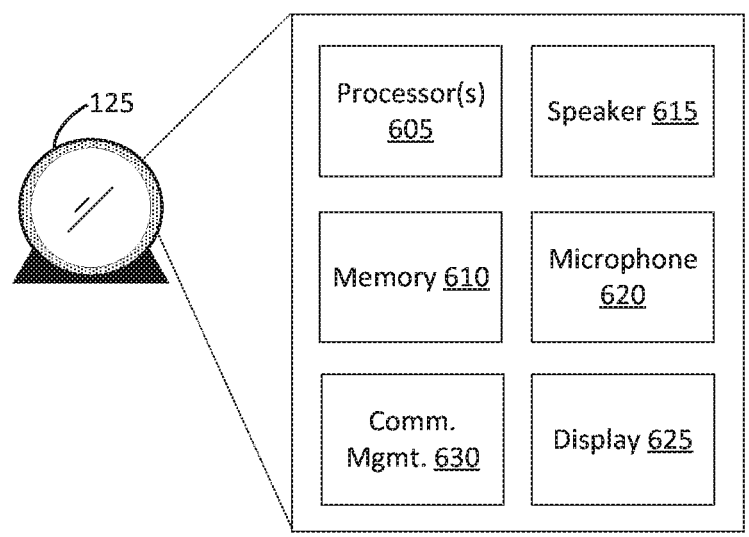
FIG. 6 illustrates an example of an assistant device.

FIG. 6 illustrates an example of an assistant device. In FIG. 6, assistant device 105 includes a processor 605, memory 610, touchscreen display 625, speaker 615, microphone 635, as well as other types of hardware such as non-volatile memory, an interface device, camera, radios, etc. to implement communication management logic 630 providing the techniques disclosed herein. Various common components (e.g., cache memory) are omitted for illustrative simplicity. The assistant device is intended to illustrate a hardware device on which any of the components described in the example of FIGS. 1-3 (and any other components described in this specification) can be implemented. The components of the assistant device can be coupled together via a bus or through some other known or convenient device.

The processor 605 may be, for example, a microprocessor circuit such as an Intel Pentium microprocessor or Motorola power PC microprocessor. One of skill in the relevant art will recognize that the terms "machine-readable (storage) medium" or "computer-readable (storage) medium" include any type of device that is accessible by the processor. Processor 605 can also be circuitry such as an application specific integrated circuits (ASICs), complex programmable logic devices (CPLDs), field programmable gate arrays (FPGAs), structured ASICs, etc.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk; a magnetic-optical disk; an optical disk; a read-only memory (ROM) such as a CD- ROM, EPROM, or EEPROM; a magnetic or optical card; or another form of storage for large amounts of data. Some of this data is often written, by a direct memory access process, into memory during the execution of software in the computer. The non-volatile storage can be local, remote or distributed. The non-volatile memory is optional because systems can be created with all applicable data available in memory. A typical computer system will usually include at least a processor, memory, and a device (e.g., a bus) coupling the memory to the processor.

The software can be stored in the non-volatile memory and/or the drive unit. Indeed, storing an entire large program in memory may not even be possible. Nevertheless, it should be understood that for software to run, it may be necessary to move the software to a computer-readable location appropriate for processing, and, for illustrative purposes, that location is referred to as memory in this application. Even when software is moved to memory for execution, the processor will typically make use of hardware registers to store values associated with the software and make use of a local cache that, ideally, serves to accelerate execution. As used herein, a software program is can be stored at any known or convenient location (from non-volatile storage to hardware registers).

The bus also couples the processor to the network interface device. The interface can include one or more of a modem or network interface. Those skilled in the art will appreciate that a modem or network interface can be considered to be part of the computer system. The interface can include an analog modem, an ISDN modem, a cable modem, a token ring interface, a satellite transmission interface (e.g., "direct PC"), or other interface for coupling a computer system to other computer systems. The interface can include one or more input and/or output devices. The input and/or output devices can include, by way of example but not limitation, a keyboard, a mouse or other pointing device, disk drives, printers, a scanner, and other input and/or output devices, including a display device. The display device can include, by way of example but not limitation, a cathode ray tube (CRT), a liquid crystal display (LCD), or some other applicable known or convenient display device.

In operation, the assistant device can be controlled by operating system software that includes a file management system, such as a disk operating system. The file management system is typically stored in the non-volatile memory and/or drive unit and causes the processor to execute the various acts required by the operating system to input and output data, and to store data in the memory, including storing files on the non-volatile memory and/or drive unit.

Some items of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electronic or magnetic signals capable of being stored, transferred, combined, compared, and/or otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, those skilled in the art will appreciate that throughout the description, discussions utilizing terms such as "processing" or "computing" or "calculating" or "determining" or "displaying" or "generating" or the like refer to the action and processes of a computer system or similar electronic computing device that manipulates and transforms data represented as physical (electronic) quantities within the computer system's registers and memories into other data similarly represented as physical quantities within the computer system's memories or registers or other such information storage, transmission, or display devices.

The algorithms and displays presented herein are not inherently related to any particular computer or other apparatus. Various general-purpose systems may be used with programs in accordance with the teachings herein, or it may prove convenient to construct more specialized apparatuses to perform the methods of some embodiments. The required structure for a variety of these systems will be apparent from the description below. In addition, the techniques are not described with reference to any particular programming language, and various embodiments may thus be implemented using a variety of programming languages.

In further embodiments, the assistant device operates as a standalone device or may be connected (e.g., networked) to other machines. In a networked deployment, the assistant device may operate in the capacity of a server or of a client machine in a client-server network environment or may operate as a peer machine in a peer-to-peer (or distributed) network environment.

In some embodiments, the assistant devices include a machine-readable medium. While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database and/or associated caches and servers) that store the one or more sets of instructions. The term "machine-readable medium" and "machine-readable storage medium" should also be taken to include any medium that is capable of storing, encoding, or carrying a set of instructions for execution by the machine, and which causes the machine to perform any one or more of the methodologies or modules of the presently disclosed technique and innovation.

In general, the routines executed to implement the embodiments of the disclosure may be implemented as part of an operating system or a specific application, component, program, object, module, or sequence of instructions referred to as "computer programs." The computer programs typically comprise one or more instructions set at various times in various memory and storage devices in a computer that, when read and executed by one or more processing units or processors in a computer, cause the computer to perform operations to execute elements involving various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally, regardless of the particular type of machine- or computer-readable media used to actually effect the distribution.

Further examples of machine-readable storage media, machine-readable media, or computer-readable (storage) media include, but are not limited to, recordable type media such as volatile and non-volatile memory devices, floppy and other removable disks, hard disk drives, optical disks (e.g., Compact Disc Read-Only Memory (CD-ROMS), Digital Versatile Discs, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice-versa. The foregoing is not intended to be an exhaustive list in which a change in state for a binary one to a binary zero or vice-versa in a memory device may comprise a transformation, such as a physical transformation. Rather, the foregoing is intended as illustrative examples.

A storage medium may typically be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe certain principles and practical applications, thereby enabling others skilled in the relevant art to understand the subject matter, the various embodiments and the various modifications that are suited to the particular uses contemplated.

While embodiments have been described in the context of fully functioning computers and computer systems, those skilled in the art will appreciate that the various embodiments are capable of being distributed as a program product in a variety of forms and that the disclosure applies equally regardless of the particular type of machine- or computer-readable media used to actually effect the distribution.

Although the above Detailed Description describes certain embodiments and the best mode contemplated, no matter how detailed the above appears in text, the embodiments can be practiced in many ways. Details of the systems and methods may vary considerably in their implementation details while still being encompassed by the specification. As noted above, particular terminology used when describing certain features or aspects of various embodiments should not be taken to imply that the terminology is being redefined herein to be restricted to any specific characteristics, features, or aspects of the disclosed technique with which that terminology is associated. In general, the terms used in the following claims should not be construed to limit the disclosure to the specific embodiments disclosed in the specification, unless those terms are explicitly defined herein. Accordingly, the actual scope of the technique encompasses not only the disclosed embodiments but also all equivalent ways of practicing or implementing the embodiments under the claims.

The language used in the specification has been principally selected for readability and instructional purposes, and it may not have been selected to delineate or circumscribe the inventive subject matter. It is therefore intended that the scope of the technique be limited not by this Detailed Description, but rather by any claims that issue on an application based hereon. Accordingly, the disclosure of various embodiments is intended to be illustrative, but not limiting, of the scope of the embodiments, which is set forth in the following claims.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. A method, comprising:
    determining that a user within an environment is engaged in a conversation with another participant outside of the environment;
    determining, by a processor, characteristics of the environment;
    determining devices within the environment that can provide playback of content of the conversation corresponding to the participant or can receive content of the conversation corresponding to the user based on the characteristics of the environment;
    providing playback of the content of the conversation corresponding to the participant using a first set of resources of the devices; and
    receiving content of the conversation corresponding to the user using a second set of resources of the devices to provide to the participant, the first set of resources and the second set of resources being different.

2. The method of claim 1, wherein the first set of resources includes one or more of display screens or speakers of the devices within the environment, and the second set of resources includes one or more of cameras or microphones of the devices within the environment.

3. The method of claim 1, wherein the conversation using the mobile device includes audio content, and the playback of the content of the conversation includes audio content and video content.

4. The method of claim 1, wherein determining characteristics of the environment includes determining a location of the user within the environment, and wherein the second set of resources are selected based on the location of the user within the environment.

5. The method of claim 1, wherein determining characteristics of the environment includes identifying other people not engaged in the conversation within the environment, and wherein the first set resources and the second set of resources are selected based on the identification of other people in the environment.

6. The method of claim 1, further comprising:
    determining characteristics of the conversation between the user and the participant, and wherein the first set of resources and the second set of resources of the devices are selected based on the characteristics of the conversation.

7. The method of claim 6, wherein the characteristics of the conversation include content of the conversation.

8. The method of claim 6, wherein the characteristics of the conversation include how the user is engaged within the conversation with the other participant.

9. A computer program product, comprising one or more non-transitory computer-readable media having computer program instructions stored therein, the computer program instructions being configured such that, when executed by one or more computing devices, the computer program instructions cause the one or more computing devices to:
   determine that a user within an environment is engaged in a conversation with another participant outside of the environment;
   determine characteristics of the environment;
   determine devices within the environment that can provide playback of content of the conversation corresponding to the participant or can receive content of the conversation corresponding to the user based on the characteristics of the environment;
   provide playback of the content of the conversation corresponding to the participant using a first set of resources of the devices; and
   receive content of the conversation corresponding to the user using a second set of resources of the devices to provide to the participant, the first set of resources and the second set of resources being different.

10. The computer program product of claim 9, wherein the first set of resources includes one or more of display screens or speakers of the devices within the environment, and the second set of resources includes one or more of cameras or microphones of the devices within the environment.

11. The computer program product of claim 9, wherein the conversation using the mobile device includes audio content, and the playback of the content of the conversation includes audio content and video content.

12. The computer program product of claim 9, wherein determining characteristics of the environment includes determining a location of the user within the environment, and wherein the second set of resources are selected based on the location of the user within the environment.

13. The computer program product of claim 9, wherein determining characteristics of the environment includes identifying other people not engaged in the conversation within the environment, and wherein the first set resources and the second set of resources are selected based on the identification of other people in the environment.

14. The computer program product of claim 9, the computer program instructions cause the one or more computing devices to:
   determine characteristics of the conversation between the user and the participant, and wherein the first set of resources and the second set of resources of the devices are selected based on the characteristics of the conversation.

15. The computer program product of claim 14, wherein the characteristics of the conversation include content of the conversation.

16. The computer program product of claim 14, wherein the characteristics of the conversation include how the user is engaged within the conversation with the other participant.

17. An electronic device, comprising:
   a memory configured to store device information representing devices within an environment; and
   a processor configured to determine that a user within the environment is engaged in a conversation with another participant outside of the environment, the processor configured to determine characteristics of the environment, and the processor configured to select a first set of devices to provide playback of content of the conversation corresponding to the other participant for the user and a second set of devices having resources to provide content corresponding to the user for the other participant in the conversation outside of the environment based on the device information stored in the memory, the first set of devices and the second set of devices selected based on the characteristics of the environment.

18. The electronic device of claim 17, wherein the first set of devices and the second set of devices are different, the first set of devices including one or more of display screens or speakers, the second set of devices including one or more of cameras or microphones.

19. The electronic device of claim 17, further comprising:
   a microphone configured to receive speech corresponding to the user engaged in the conversation; and
   a camera configured to generate an image frame representing the environment, wherein the characteristics of the environment are determined based on the speech received via the microphone and the image frame representing the environment generated by the camera.

20. The electronic device of claim 17, wherein the characteristics of the environment includes determining a location of the user within the environment, and wherein the first set of the devices and the second set of the devices are selected based on the location of the user within the environment.

21. The electronic device of claim 17, wherein determining characteristics of the environment includes identifying other people not engaged in the conversation within the environment, and wherein the first set of the devices and the second set of the devices are selected based on the identification of other people in the environment.

22. The electronic device of claim 17, wherein the processor is further configured to determine characteristics of the conversation between the user and the participant, and wherein the first set of the devices and the second set of the devices are selected based on the characteristics of the conversation.

23. The electronic device of claim 22, wherein the characteristics of the conversation include content of the conversation.

24. The electronic device of claim 22, wherein the characteristics of the conversation include how the user is engaged within the conversation with the other participant.

* * * * *